(12) United States Patent
Kechroud et al.

(10) Patent No.: US 11,011,893 B2
(45) Date of Patent: May 18, 2021

(54) SEISMIC SUPPORT STRUCTURE

(71) Applicant: General Electric Technology GmbH, Baden (CH)

(72) Inventors: Riyad Kechroud, La Prairie (CA); Clement Rollier, Hudson (CA); Pascal Babin, St.-Jacques-le-Mineur (CA)

(73) Assignee: General Electric Technology GmbH, Baden (CH)

( * ) Notice: Subject to any disclaimer, the term of this patent is extended or adjusted under 35 U.S.C. 154(b) by 27 days.

(21) Appl. No.: 16/249,793

(22) Filed: Jan. 16, 2019

(65) Prior Publication Data
US 2020/0227898 A1 Jul. 16, 2020

(51) Int. Cl.
*H02B 1/54* (2006.01)
*E04B 1/98* (2006.01)
*E04H 9/02* (2006.01)

(52) U.S. Cl.
CPC ............ *H02B 1/54* (2013.01); *E04B 1/98* (2013.01); *E04H 9/021* (2013.01)

(58) Field of Classification Search
CPC .......... H02B 1/54; E04B 1/98; E04H 9/021
USPC ....................................................... 52/167.3
See application file for complete search history.

(56) References Cited

U.S. PATENT DOCUMENTS

| | | | | |
|---|---|---|---|---|
| 1,569,358 A * | 1/1926 | Cross | ............... | A47B 61/00 211/182 |
| 2,201,608 A * | 5/1940 | Causey | ............... | E04G 1/00 182/178.5 |
| 2,360,999 A * | 10/1944 | Wyen | ............... | E04G 1/00 182/17 |
| 2,446,972 A * | 8/1948 | Wyen | ............... | E04G 1/00 52/632 |
| 2,584,015 A * | 1/1952 | Hawes | ............... | E04G 13/00 248/354.4 |
| 2,626,189 A * | 1/1953 | Brown | ............... | E04G 1/06 52/638 |
| 2,830,852 A * | 4/1958 | Fritz | ............... | E04G 1/28 182/87 |
| 2,982,379 A * | 5/1961 | Fisher | ............... | E04H 12/185 52/111 |
| 3,071,204 A * | 1/1963 | Piltingsrud | ............... | E04G 1/00 182/27 |
| 3,190,405 A * | 6/1965 | Squire | ............... | E04G 1/00 52/637 |
| 3,221,837 A * | 12/1965 | Fisher | ............... | E04G 1/34 182/115 |
| 3,418,768 A * | 12/1968 | Cardan | ............... | E04H 9/02 52/167.1 |
| 3,480,110 A * | 11/1969 | Coleman | ............... | E04G 1/15 182/182.4 |
| 3,556,310 A * | 1/1971 | Loukotsky | ............... | E04H 12/10 211/189 |
| 3,561,608 A * | 2/1971 | Weider | ............... | A47B 57/30 211/191 |

(Continued)

*Primary Examiner* — Patrick J Maestri
*Assistant Examiner* — Joseph J. Sadlon
(74) *Attorney, Agent, or Firm* — Eversheds Sutherland (US) LLP

(57) ABSTRACT

Embodiments of the disclosure can include systems and methods for providing a seismic support structure for electrical equipment, including low voltage or high voltage electrical equipment and power transmission equipment, to be supported above a surface, such as the ground or a foundation.

15 Claims, 4 Drawing Sheets

(56) References Cited

U.S. PATENT DOCUMENTS

| | | | | |
|---|---|---|---|---|
| 3,564,802 A * | 2/1971 | Dreyfus | | E04G 11/48 52/637 |
| 3,612,291 A * | 10/1971 | Skubic | | A47B 47/022 211/208 |
| 3,676,972 A * | 7/1972 | Ballou | | E04G 1/14 52/638 |
| 3,685,665 A * | 8/1972 | Atwater | | A47B 55/00 211/191 |
| 3,796,017 A * | 3/1974 | Meckler | | E04B 1/24 52/292 |
| 3,818,083 A * | 6/1974 | Butts | | E04B 5/29 264/31 |
| 3,826,057 A * | 7/1974 | Franklin | | E04C 3/08 52/641 |
| 3,850,264 A * | 11/1974 | Salinas | | E04G 1/15 182/178.3 |
| 4,004,393 A * | 1/1977 | Morris | | E04G 7/305 52/637 |
| 4,026,079 A * | 5/1977 | Morris | | E04G 1/14 52/126.7 |
| 4,102,108 A * | 7/1978 | Cody | | E04B 1/24 403/156 |
| 4,104,042 A * | 8/1978 | Brozenick | | B03C 3/025 52/638 |
| 4,106,256 A * | 8/1978 | Cody | | E04B 1/24 249/28 |
| 4,136,785 A * | 1/1979 | McDevitt | | B63B 25/002 182/178.1 |
| 4,363,149 A * | 12/1982 | Kondo | | E04H 9/021 14/73.5 |
| 4,417,426 A * | 11/1983 | Meng | | E04B 1/34352 52/126.7 |
| 4,481,748 A * | 11/1984 | D'Alessio | | E04G 11/48 182/178.5 |
| 4,577,826 A * | 3/1986 | Bergstrom | | F16F 15/02 174/161 R |
| 4,585,204 A * | 4/1986 | Parker | | E04G 11/40 249/27 |
| 4,640,385 A * | 2/1987 | Underhill | | E04G 1/28 182/113 |
| 4,680,904 A * | 7/1987 | Stoecker | | E04B 1/34342 52/126.3 |
| 4,708,252 A * | 11/1987 | Azzi | | A47B 57/04 108/108 |
| 5,024,036 A * | 6/1991 | Johnson | | A47B 47/04 405/262 |
| 5,263,297 A * | 11/1993 | Kim | | E04C 3/34 52/244 |
| 5,267,631 A * | 12/1993 | Mendel | | E04G 1/24 182/107 |
| 5,269,112 A * | 12/1993 | Weinrub | | G09F 15/0068 211/189 |
| 5,301,486 A * | 4/1994 | Taylor | | E04B 5/12 52/638 |
| 5,359,821 A * | 11/1994 | Merriman | | E02D 27/34 52/126.6 |
| 5,385,215 A * | 1/1995 | Williams | | E04G 1/14 182/113 |
| 5,456,334 A * | 10/1995 | Brignac | | E04G 1/24 182/152 |
| 5,491,939 A * | 2/1996 | Wang | | E04F 11/02 52/185 |
| 5,575,591 A * | 11/1996 | Vanderklaauw | | E01D 2/00 405/230 |
| D387,180 S * | 12/1997 | Meadows | | E04B 1/24 D25/66 |
| 5,729,936 A * | 3/1998 | Maxwell | | E04C 2/16 52/220.2 |
| 5,729,949 A * | 3/1998 | Hartzheim | | E04C 5/206 211/59.2 |
| 5,865,270 A * | 2/1999 | Strength | | E04G 1/20 182/179.1 |
| 5,901,522 A * | 5/1999 | Slater | | E04B 1/24 52/641 |
| 6,028,570 A * | 2/2000 | Gilger | | H01Q 1/288 343/880 |
| 6,185,898 B1 * | 2/2001 | Pratt | | E04B 1/26 52/657 |
| 6,443,262 B1 * | 9/2002 | Karanouh | | E04G 1/14 182/178.1 |
| 6,604,640 B1 * | 8/2003 | Jehin | | A47B 47/027 211/189 |
| 6,663,316 B1 * | 12/2003 | Harris | | E04C 5/167 404/136 |
| 6,739,429 B1 * | 5/2004 | Peals | | E04G 5/00 182/178.1 |
| 6,837,017 B2 * | 1/2005 | Hardy, Jr. | | E01C 11/18 404/136 |
| 6,863,155 B2 * | 3/2005 | Wyse | | E04G 1/24 182/118 |
| 7,086,341 B2 * | 8/2006 | Peddicord | | A47B 13/02 108/153.1 |
| 7,090,176 B2 * | 8/2006 | Chavot | | H02B 3/00 211/200 |
| 7,225,589 B1 * | 6/2007 | Smith | | E02D 27/02 52/292 |
| 7,231,742 B2 * | 6/2007 | Majlessi | | E04B 1/24 52/167.3 |
| 7,301,457 B2 * | 11/2007 | Houston | | G08B 13/183 248/121 |
| 7,311,487 B1 * | 12/2007 | Crossley | | B65G 7/02 414/331.06 |
| 7,870,702 B2 * | 1/2011 | McKay | | E04C 5/20 248/346.03 |
| 7,966,686 B2 * | 6/2011 | Turner | | B60S 3/063 15/53.1 |
| 7,971,408 B2 * | 7/2011 | Hayes, Sr. | | E04G 27/00 52/143 |
| 7,980,814 B2 * | 7/2011 | Nieuwenhuizen | | E04H 12/085 415/119 |
| 8,322,108 B2 * | 12/2012 | Lee | | E04C 5/08 52/677 |
| 8,393,118 B2 * | 3/2013 | Fang | | E04H 12/10 52/167.1 |
| 8,418,413 B2 * | 4/2013 | Marmo | | E02D 27/42 52/167.4 |
| 8,794,381 B2 * | 8/2014 | Clear | | F16B 7/105 182/178.1 |
| 8,827,232 B2 * | 9/2014 | Crowley | | A47B 43/003 211/175 |
| 8,844,205 B2 * | 9/2014 | Michael | | F16F 9/303 52/1 |
| 8,844,209 B1 * | 9/2014 | Oliver | | E02D 27/50 52/23 |
| 8,984,751 B2 * | 3/2015 | Ramos | | F24S 25/30 29/890.033 |
| 9,085,897 B2 * | 7/2015 | Quine | | E04B 1/985 |
| 9,206,616 B2 * | 12/2015 | Sarlis | | E04H 9/021 |
| 9,909,314 B2 * | 3/2018 | Jobin | | E04C 3/005 |
| 10,309,098 B2 * | 6/2019 | Chadwell | | F16B 5/01 |
| 10,344,436 B2 * | 7/2019 | Guven | | E01D 15/124 |
| 10,400,754 B2 * | 9/2019 | Rodriguez Tsouroukdissian | | F16F 15/02 |
| 10,590,670 B2 * | 3/2020 | Ferrari | | E04H 9/021 |
| 2007/0045048 A1 * | 3/2007 | Wyse | | E04G 5/10 182/178.1 |
| 2010/0024335 A1 * | 2/2010 | Bianco | | E02D 27/42 52/297 |
| 2011/0131896 A1 * | 6/2011 | Hansen | | E04B 1/24 52/167.3 |
| 2011/0239551 A1 * | 10/2011 | Goto | | E04H 9/024 52/167.3 |
| 2012/0080266 A1 * | 4/2012 | Brock | | E04G 5/06 182/107 |

* cited by examiner

US 11,011,893 B2

SEISMIC SUPPORT STRUCTURE

TECHNICAL FIELD

The disclosure relates to support structures, and in particular to systems and methods for providing a seismic support structure.

BACKGROUND

Conventional power transmission equipment, such as low and high voltage equipment, is oftentimes elevated above ground using support structures which keep the equipment suitably elevated to protect the equipment and personnel. In seismically active regions, conventional support structures may fail due to the seismic stress and accompanying vibrations caused by a seismic event. Conventional seismic structures such as supporting structures for power transmission equipment or other electric equipment can be designed to meet at least two design criteria. First, such structures can be designed to have sufficient structural resistance to counteract the effects of a seismic event. Second, such structures should have sufficient dynamic properties so that the dynamic response of equipment being supported by the supporting structures is within acceptable limits. The dynamic properties of supporting structures can account for an amount of movement the equipment can tolerate during a seismic event, and a limit at which the equipment can accelerate during a seismic event.

During a seismic event, a support structure and any supported equipment generally react as an integrated system. The dynamic response of the equipment can be amplified or significantly altered by the associated support structure depending on the characteristics of the support structure. Thus, a relatively rigid conventional support structure can transmit the seismic movements to the equipment with limited amplification, apart from the case where there is resonance. On the other hand, a relatively flexible support structure can amplify the seismic movement but may modify the frequency of the movement. Equipment mounted on relatively high and flexible support structures may subsequently be subjected to amplification of a seismic movement several times higher than if the equipment were mounted on a relatively flexible support structure, or a support structure anchored directly to the ground.

BRIEF DESCRIPTION OF THE DISCLOSURE

Some or all of the above needs and/or problems may be addressed by certain embodiments of the disclosure. Certain embodiments can include a seismic support structure for supporting low voltage and/or high voltage equipment, such as power transmission equipment or a high voltage circuit disconnect switch, or other electric or non-electric equipment, above a surface.

According to one embodiment, there is disclosed a support structure that can include a pivot structure with a first base plate mounted to a surface, a first vertical column extending from the first base plate and away from the surface, and a second vertical column extending from the first base plate and away from the surface. The pivot structure can further include, at a predefined distance above the surface, a first horizontal strut extending between the first vertical column and the second vertical column, at an upper portion of the first vertical column and an upper portion of the second vertical column, a second horizontal strut extending between the first vertical column and the second vertical column, and at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure. The support structure can further include a second base plate mounted to the surface, a third vertical column extending from the second base plate and away from the surface, a fourth vertical column extending from the second base plate and away from the surface, at a predefined distance above the surface, a third horizontal strut extending between the third vertical column and the fourth vertical column, at an upper portion of the third vertical column and an upper portion of the fourth vertical column, a fourth horizontal strut extending between the third vertical column and the fourth vertical column, at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure. The support structure can further includes a first diagonal brace extending from a central portion of the first horizontal strut to a central portion of the second horizontal strut to connect the pivot structure to the jaw structure, and a second diagonal brace extending from a central portion of the second horizontal strut to a central portion of the first horizontal strut to further connect the pivot structure to the jaw structure.

According to another embodiment, there is disclosed a method for providing a support structure for supporting high voltage equipment above a surface. The method can include providing a pivot structure including a first base plate mounted to a surface, a first vertical column extending from the first base plate and away from the surface, a second vertical column extending from the first base plate and away from the surface, at a predefined distance above the surface, a first horizontal strut extending between the first vertical column and the second vertical column, at an upper portion of the first vertical column and an upper portion of the second vertical column, a second horizontal strut extending between the first vertical column and the second vertical column, and at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure. The method can also include providing a jaw structure including a second base plate mounted to the surface, a third vertical column extending from the second base plate and away from the surface, a fourth vertical column extending from the second base plate and away from the surface, at a predefined distance above the surface, a third horizontal strut extending between the third vertical column and the fourth vertical column, at an upper portion of the third vertical column and an upper portion of the fourth vertical column, a fourth horizontal strut extending between the third vertical column and the fourth vertical column, at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure. The method can further include providing a first diagonal brace extending from a central portion of the first horizontal strut to a central portion of the second horizontal strut to connect the pivot structure to the jaw structure. The method can also include providing a second diagonal brace extending from a central portion of the second horizontal strut to a central portion of the first horizontal strut to further connect the pivot structure to the jaw structure.

According to yet to another embodiment, there is disclosed a support structure for supporting high-voltage equipment above a surface. The support structure can include a pivot structure with a first base plate mounted to a surface, a first vertical column extending from the first base plate and away from the surface, a second vertical column extending from the first base plate and away from the surface; at a predefined distance above the surface, a first horizontal strut extending between the first vertical column and the second vertical column, at an upper portion of the first vertical column and an upper portion of the second vertical column, a second horizontal strut extending between the first vertical column and the second vertical column; at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure, one or more first set of angled struts positioned between the first vertical column and the first base plate, wherein each of the one or more first set of angled struts is welded to the first vertical column and further welded to the first base plate, and one or more second set of angled struts positioned between the second vertical column and the first base plate, wherein each of the one or more second set of angled struts is welded to the second vertical column and further welded to the first base plate; wherein the first base plate comprises an oval shape flat plate with a first semi-circular portion at a first end and a second semi-circular portion an opposing second end, and the first vertical column mounts to the first semi-circular portion and the second vertical column mounts to the second semi-circular portion. The support structure can also include a jaw structure with a second base plate mounted to the surface, a third vertical column extending from the second base plate and away from the surface, a fourth vertical column extending from the second base plate and away from the surface, at a predefined distance above the surface, a third horizontal strut extending between the third vertical column and the fourth vertical column, at an upper portion of the third vertical column and an upper portion of the fourth vertical column, a fourth horizontal strut extending between the third vertical column and the fourth vertical column, at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure, one or more third set of angled struts positioned between the third vertical column and the second base plate, wherein each of the one or more third set of angled struts is welded to the third vertical column and further welded to the second base plate, and one or more fourth set of angled struts positioned between the fourth vertical column and the second base plate, wherein each of the one or more fourth set of angled struts is welded to the fourth vertical column and further welded to the second base plate, wherein the second base plate comprises an oval shape flat plate with a third semi-circular portion at a third end, and a fourth semi-circular portion an opposing fourth end, and the third vertical column mounts to the third semi-circular portion and the fourth vertical column mounts to the fourth semi-circular portion; and wherein the first base plate and second base plate, each mount to the surface at a central portion of the respective first base plate and second base plate. The support structure can further include a first diagonal brace extending from a central portion of the first horizontal strut to a central portion of the second horizontal strut to connect the pivot structure to the jaw structure, and a second diagonal brace extending from a central portion of the second horizontal strut to a central portion of the first horizontal strut to further connect the pivot structure to the jaw structure; wherein the first vertical column is vertically aligned with respect to the surface and the third vertical column is vertically aligned with respect to the surface, and the first vertical column and third vertical column are angled towards each other, wherein the second vertical column is vertically aligned with respect to the surface and the fourth vertical column is vertically aligned with respect to the surface, and the second vertical column and fourth vertical column are angled towards each other, wherein the first vertical column, the second vertical column, the third vertical column, the fourth vertical column, the first diagonal brace, and the second diagonal brace, each comprise a tubular shape, wherein at least one vertical beam extends from the first base plate and supports control equipment associated with the high voltage equipment, wherein a distance between an upper end of the first vertical column and an upper end of the second vertical column is less than the distance between a lower opposing end of the first vertical column and a lower opposing end of the second vertical column, wherein a distance between an upper end of the third vertical column and an upper end of the fourth vertical column is less than the distance between a lower opposing end of the third vertical column and a lower opposing end of the fourth vertical column, and wherein the first base plate is connected to the first vertical column and the second vertical column by welds between each of the first base plate and the first vertical column and between the first base plate and the second vertical column.

Other embodiments, systems, methods, apparatuses, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items.

Certain implementations will now be described more fully below with reference to the accompanying drawings, in which various implementations and/or aspects are shown. Various aspects may, however, be implemented in many different forms and should not be construed as limited to the implementations set forth herein Like numbers refer to like elements throughout. The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

DETAILED DESCRIPTION

Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Illustrated embodiments herein are directed to, among other things, systems and methods for providing a seismic support structure. Certain embodiments are directed to a seismic support structure for electrical equipment. Certain embodiments are directed to a seismic support structure for low voltage and/or high voltage electrical equipment supported above a surface, such as the ground or a foundation. Technical effects of certain embodiments of the disclosure may include providing sufficient flexibility in a seismic support structure to withstand certain seismic stresses. Further technical effects of certain embodiments of the disclosure may allow certain seismic support structures to support low or high voltage electrical equipment above a surface, and to withstand certain seismic stresses on the seismic support structure by providing sufficient flexibility in the seismic support structure. Certain technical effects of certain embodiments of the disclosure may also provide increased reliability in supporting and operating low and/or high voltage electrical equipment supported by a seismic support structure.

Figure 1:
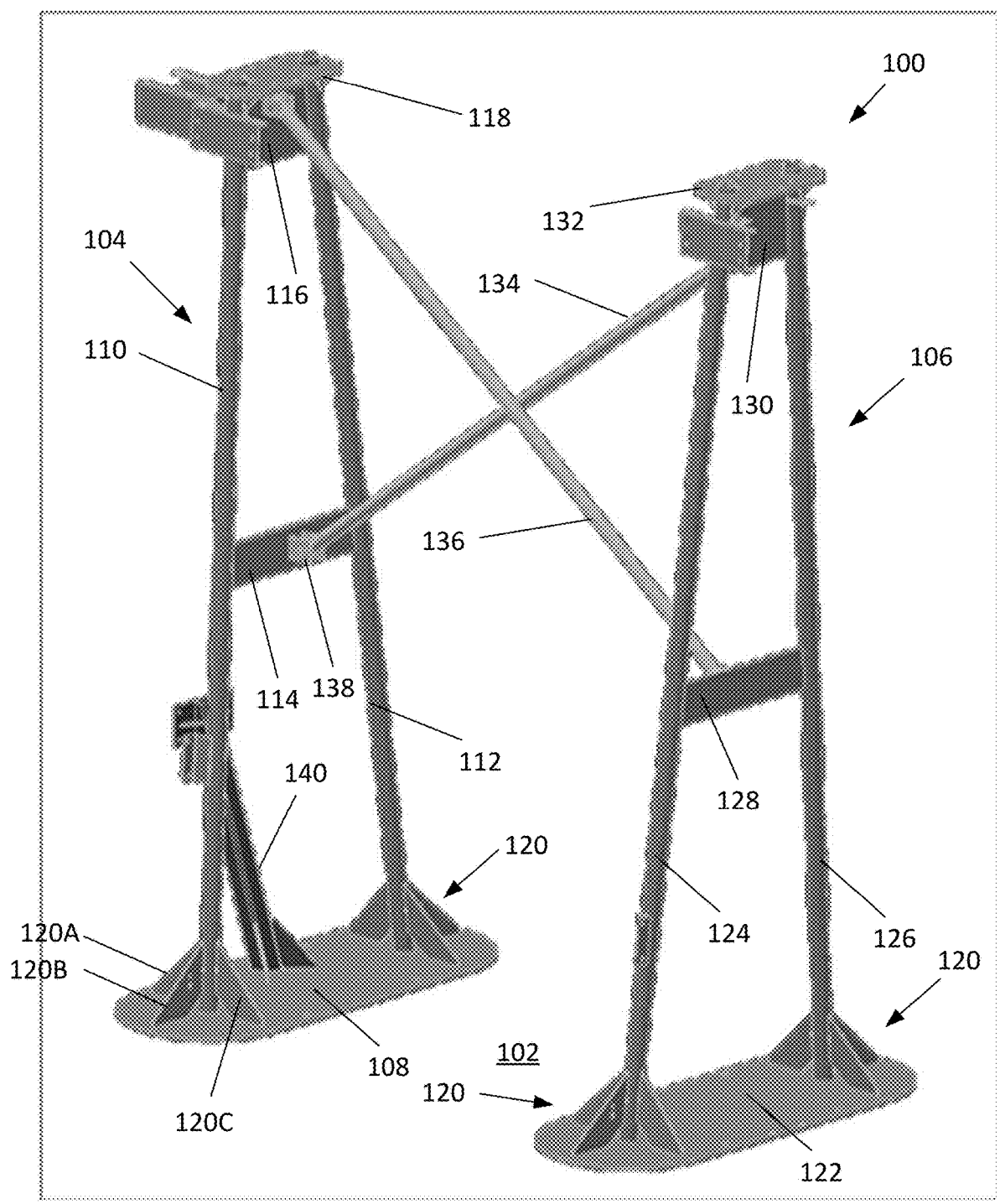
FIG. 1 depicts a front perspective view of an example seismic support structure, according to one example embodiment.

FIG. 1 depicts a front perspective view of an example seismic support structure, according to one example embodiment. The seismic support structure 100 shown in FIG. 1 can support electrical equipment, such as a high voltage circuit disconnect switch, above a surface 102, such as a foundation or the ground. Other electrical equipment which can be supported by a seismic support structure can be power transmission equipment, low or high voltage electric equipment, or non-electrical equipment. The seismic support structure 100 can include two substructures, such as a pivot structure 104 (also called a hinge structure) and a jaw structure 106. The pivot structure 104 can be a first portion of the seismic support structure 100 associated with a pivoting body (not shown) operable to cooperate with a moving blade (not shown). The jaw structure 106 can be a second portion of the seismic support structure 100 associated with a moving blade (not shown) operable to cooperate with a pivoting body (not shown). In one embodiment, a high voltage circuit disconnect switch can include a pivoting body and a moving blade.

In certain embodiments, the separation of the seismic support structure into two structures, such as a pivot structure and a jaw structure can provide increased flexibility for the overall system.

As shown in FIG. 1, the pivot structure 104 can include a first base plate 108, a first vertical column 110, a second vertical column 112, a first horizontal strut 114, a second horizontal strut 116, and a first horizontal support plate 118. The first base plate 108 can be a relatively flat, oval shape base with a first semi-circular portion at a first end, a second semi-circular portion at a second end, and a central portion between the first end and second end. The first base plate 108 can be mounted to or otherwise secured to the surface 102 at the central portion using one or more threaded mounting bolts (not shown) passing through the first base plate 108 and into the surface, or in some instances, a foundation or the ground.

Each of the first vertical column 110 and the second vertical column 112 can be positioned on and welded to an upper surface of the first base plate 108, or in some embodiments, each of the first vertical column 110 and the second vertical column 112 can extend through the first base plate 108 and also be welded to the first base plate 108. In any instance, each of the first vertical column 110 and the second vertical column 112 can extend substantially vertical from the first base plate 108, and are angled from the first base plate 108 such that a distance between the lower portions of the first vertical column 110 and the second vertical column 112 is greater than a distance between the upper portions of the first vertical column 110 and the second vertical column 112. The first vertical column 110 is generally located within the first semi-circular portion at the first end of the first base plate 108, and the second vertical column 112 is generally located within the second semi-circular portion at the second end of the first base plate 108.

Figure 3:
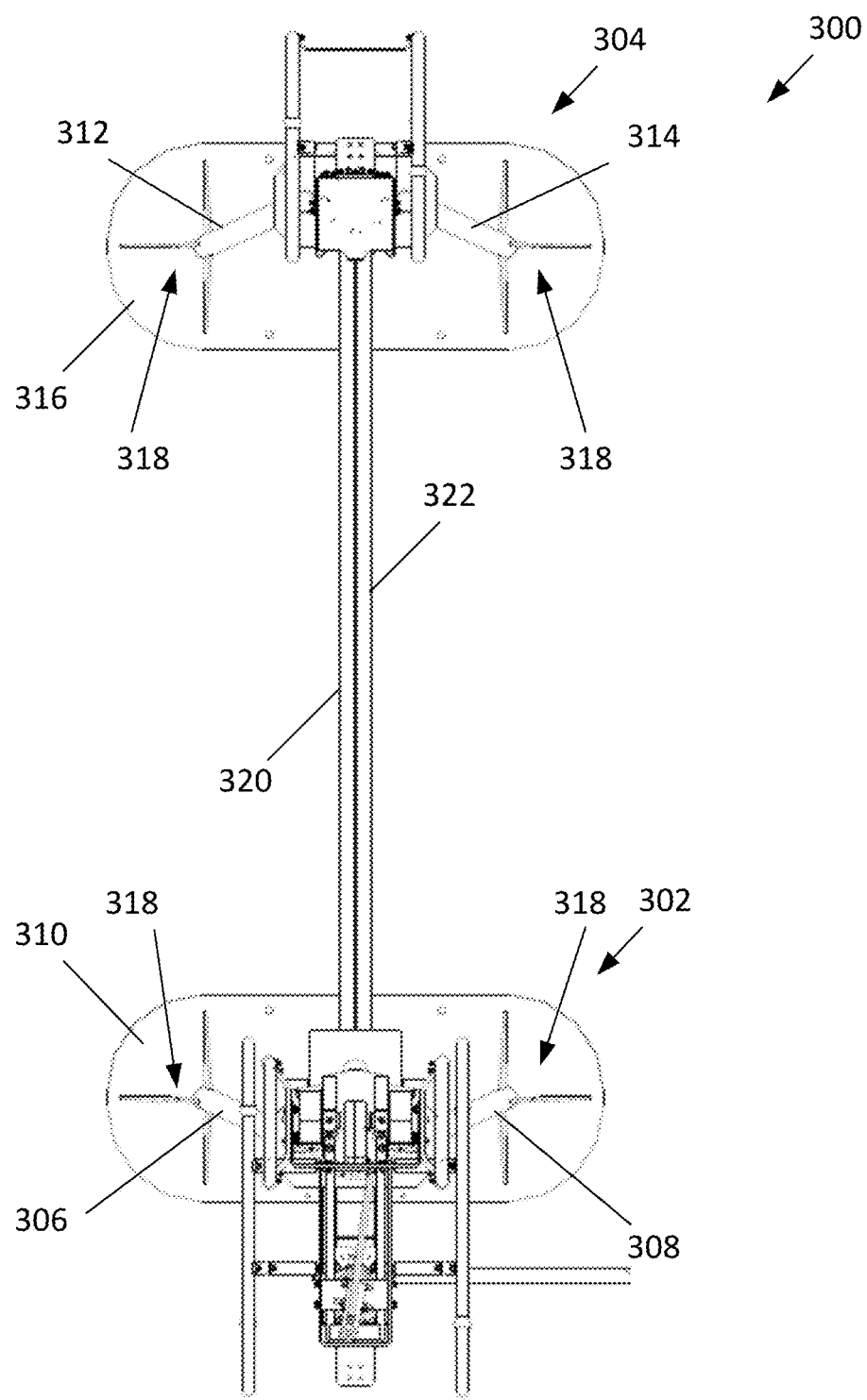
FIG. 3 depicts an overhead view of an example seismic support structure, according to one example embodiment.

In certain embodiments, such as shown in FIGS. 1 and 3, each of the first vertical column 110 and the second vertical column 112 can extend substantially vertical from the first base plate 108, can be angled from the first base plate 108 such that a distance between the lower portions of the first vertical column 110 and the second vertical column 112 is greater than a distance between the upper portions of the first vertical column 110 and the second vertical column 112, and can be further angled such that the first vertical column 110 and the second vertical column 112 are cantilevered away from the corresponding jaw structure 106.

In certain embodiments, the welded connections between the vertical columns 110, 112 and the base plate 108 as well as the locations of and orientations of the vertical columns 110, 112 with respect to the base plate 108 can increase the flexibility of the seismic support structure 100.

At a predefined distance above the surface 102, the first horizontal strut 114 can extend between the first vertical column 110 and the second vertical column 112. That is, the first horizontal strut 114 can be positioned between a central portion of the first vertical column 110 and a central portion of the second vertical column 112. The first horizontal strut 114 can connect the first vertical column 108 and the second vertical column 110.

Further, at a predefined distance above the surface 102, a second horizontal strut 116 can extend between the first vertical column 110 and the second vertical column 112. That is, the second horizontal strut 116 can be positioned between at an upper portion of the first vertical column 110 and an upper portion of the second vertical column 112. The second horizontal strut 116 can extend between the first vertical column 110 and the second vertical column 112.

As shown in FIG. 1, at the upper portion of the first vertical column 110 and the upper portion of the second vertical column 112, a first horizontal support plate 118 can extend between the first vertical column 110 and the second vertical column 112. The first horizontal support plate 118 can support at least a first insulator, shown as 206 in FIG. 2, associated with electrical equipment, shown as 210 in FIG. 2, elevated above the surface 200 by the support structure 100.

In the embodiment shown in FIG. 1, one or more angled struts, such as first angled strut 120A, second angled strut 120B, and third angled strut 120C, can be positioned between and welded to the first vertical column 110 and the first base plate 108. The respective lower ends of the one or more angled struts 120A, 120B, 120C can be in contact with the first base plate 108, and the respective upper ends of the angled struts 120A, 120B, 120C can be in contact with the lower portion of the first vertical column 110. Likewise, the second vertical column 112 can include one or more angled struts 120 in a similar configuration as angled struts 120A, 120B, 120C with respect to the first base plate 108.

As shown in FIG. 1, the jaw structure 106 can include a second base plate 122, a third vertical column 124, a fourth vertical column 126, a third horizontal strut 128, a fourth horizontal strut 130, and a second horizontal support plate 132. The second base plate 122 can be a relatively flat, oval shape base with a first semi-circular portion at a first end, a second semi-circular portion at a second end, and a central portion between the first end and second end. The second base plate 122 can be mounted to or otherwise secured to the surface 102 at the central portion using one or more threaded mounting bolts (not shown) passing through the second base plate 122 and into the surface, or in some instances, a foundation or the ground.

Each of the third vertical column 124 and the fourth vertical column 126 can be positioned on and welded to an upper surface of the second base plate 122, or in some embodiments, each of the third vertical column 124 and the fourth vertical column 126 can extend through the second base plate 122 and also be welded to the second base plate 122. In any instance, each of the third vertical column 124 and the fourth vertical column 126 can extend substantially vertical from the second base plate 122, and are angled from the second base plate 122 such that a distance between the lower portions of the third vertical column 124 and the fourth vertical column 126 is greater than a distance between the upper portions of the third vertical column 124 and the fourth vertical column 126. The third vertical column 124 is generally located within the first semi-circular portion at the first end of the second base plate 122, and the fourth vertical column 126 is generally located within the second semi-circular portion at the second end of the second base plate 122.

In certain embodiments, such as shown in FIGS. 1 and 3, each of the third vertical column 124 and the fourth vertical column 126 can extend substantially vertical from the second base plate 122, can be angled from the second base plate 122 such that a distance between the lower portions of the third vertical column 124 and the fourth vertical column 126 is greater than a distance between the upper portions of the third vertical column 124 and the fourth vertical column 126, and can be further angled such that the third vertical column 124 and the fourth vertical column 126 are cantilevered away from the corresponding pivot structure 104.

In certain embodiments, the welded connections between the vertical columns 124, 126 and the base plate 122 as well as the locations of and angled orientation of the vertical columns 124, 126 with respect to the base plate 122 can increase the flexibility of the seismic support structure 100.

At a predefined distance above the surface 102, the third horizontal strut 128 can extend between the third vertical column 124 and the fourth vertical column 126. That is, the third horizontal strut 128 can be positioned between a central portion of the third vertical column 124 and a central portion of the fourth vertical column 126. The third horizontal strut 128 can connect the third vertical column 124 and the fourth vertical column 126.

Further, at a predefined distance above the surface 102, a fourth horizontal strut 130 can extend between the third vertical column 124 and the fourth vertical column 126. That is, the fourth horizontal strut 130 can be positioned between at an upper portion of the third vertical column 124 and an upper portion of the fourth vertical column 126. The fourth horizontal strut 130 can extend between the third vertical column 124 and the fourth vertical column 126.

As shown in FIG. 1, at the upper portion of the third vertical column 124 and the upper portion of the fourth vertical column 126, a second horizontal support plate 132 can extend between the third vertical column 124 and the fourth vertical column 126. The second horizontal support plate 132 can support at least a second insulator, shown as 208 in FIG. 2, associated with electrical equipment, shown as 210 in FIG. 2, elevated above the surface 200 by the support structure 100.

Turning back to the support structure 100 in FIG. 1, the pivot structure 104 can be connected to the jaw structure 106 by one or more diagonal braces. For example, a first diagonal brace 134 can extend from a central portion of the first horizontal strut 114 to a central portion of the fourth horizontal strut to connect the pivot structure 104 to the jaw structure 106. Further, a second diagonal brace 136 can extend from a central portion of the third horizontal strut 128 to a central portion of the second horizontal strut 116 to further connect the pivot structure 104 to the jaw structure 106. In the embodiment shown, one or more corresponding support brackets 138 may be used to connect each of the diagonal braces 134, 136 to the horizontal struts 114, 116, 128, 130.

In one embodiment, and as shown in FIG. 1, a support structure 100 can include one or more angle beams 140 operable to mount to the first base plate 108, and can support a motorized control device (not shown).

In one embodiment, each of the first vertical column 110, the second vertical column 112, the third vertical column 124, the fourth vertical column 126, the first diagonal brace 134, and the second diagonal brace 136, can be a relatively small diameter tubular shape. One skilled in the art may recognize that selection of certain diameters of tubular shapes can increase or decrease the flexibility of the respective vertical columns and diagonal braces. Other suitable forms and shapes may be used for these components. In one embodiment, one or more of the tubular shaped components, including a vertical column and/or a diagonal brace, can be replaced by one or more dampers and/or shock absorbers.

One may appreciate that the novel arrangement described above for the vertical columns, respective base plates, horizontal struts, and diagonal braces in the respective pivot structure and jaw structure permit the seismic support structure shown in FIG. 1 to withstand certain seismic events and to accommodate the dynamic response of electrical equipment supported by the pivot structure and/or jaw structure.

Figure 2:
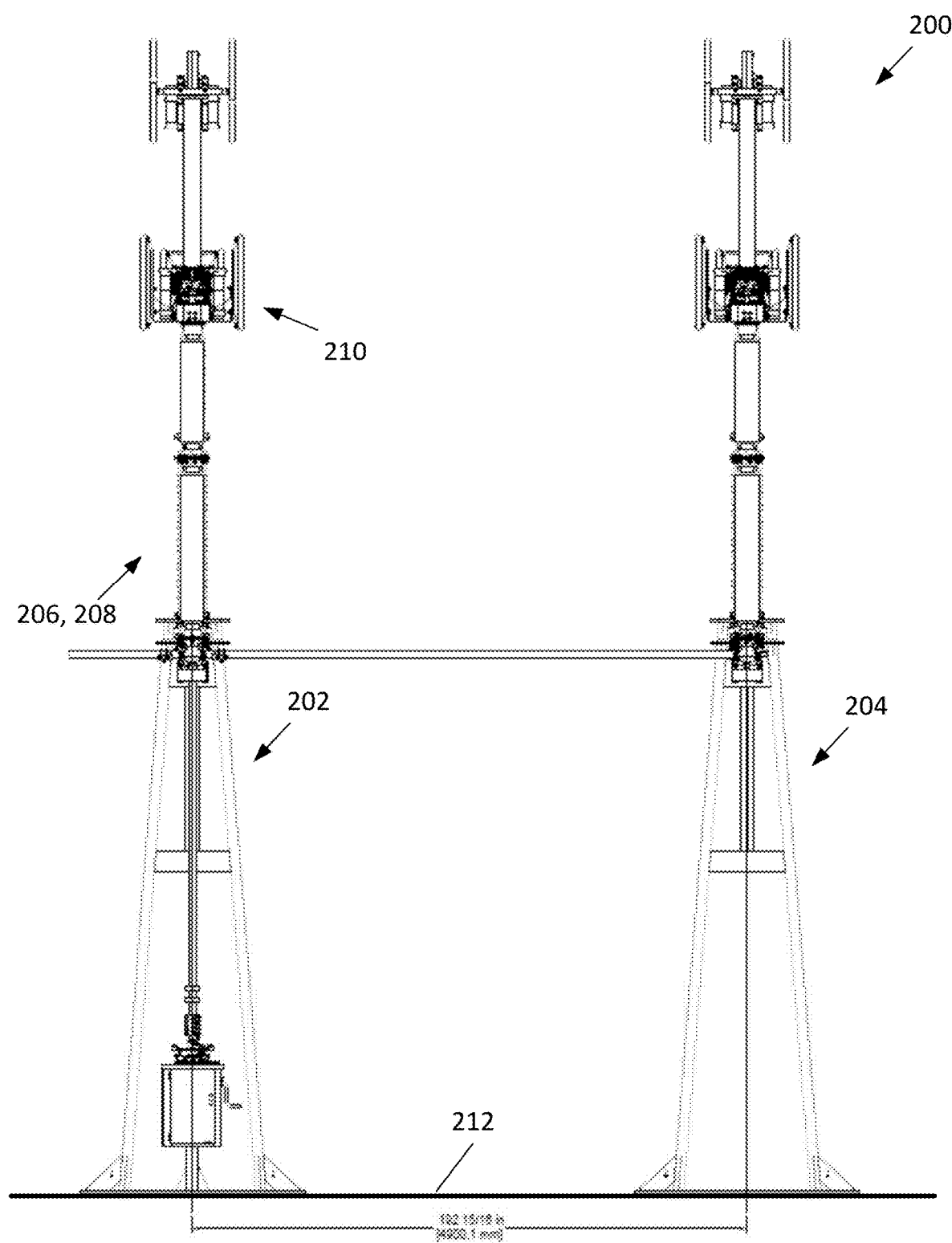
FIG. 2 depicts a side view of an example pair of seismic support structures with electric equipment mounted to an upper portion of the seismic support structures, according to one example embodiment.

FIG. 2 depicts a side view of an example pair of seismic support structures with electric equipment mounted to an upper portion of the seismic support structures, according to one example embodiment. In this embodiment, the seismic support structures 200 shown can include a first seismic support structure 202 and a second seismic support structure 204. Any number of seismic support structures can be interconnected. Electrical equipment, such as a first insulator 206 and/or a second insulator, low or high voltage equipment and/or a high voltage circuit disconnect switch, can be supported above a surface 212 by each support structure 202, 204.

One may appreciate that any number of seismic support structures may be utilized to support electric equipment above a surface, and that the example shown in FIG. 2 is not intended to be limiting.

FIG. 3 depicts an overhead view of an example seismic support structure, according to one example embodiment. In this embodiment, a seismic support structure 300, similar to 100 in FIG. 1, can include a pivot structure 302 and a jaw structure 304. In this embodiment, a first vertical column 306 and second vertical column 308 are shown extending from a first base plate 310, and a third vertical column 312 and fourth vertical column 314 are shown extending from a second base plate 316. One or more angle struts 318 are shown between respective vertical columns 306, 308, 312, 314 and base plates 310, 316. A first diagonal brace 320 and a second diagonal brace 322 connect between the pivot structure 302 and jaw structure 304. One or more corresponding support brackets 324 are shown connecting between the respective diagonal braces 320, 322 and the pivot structure 302 and jaw structure 304.

Figure 4:
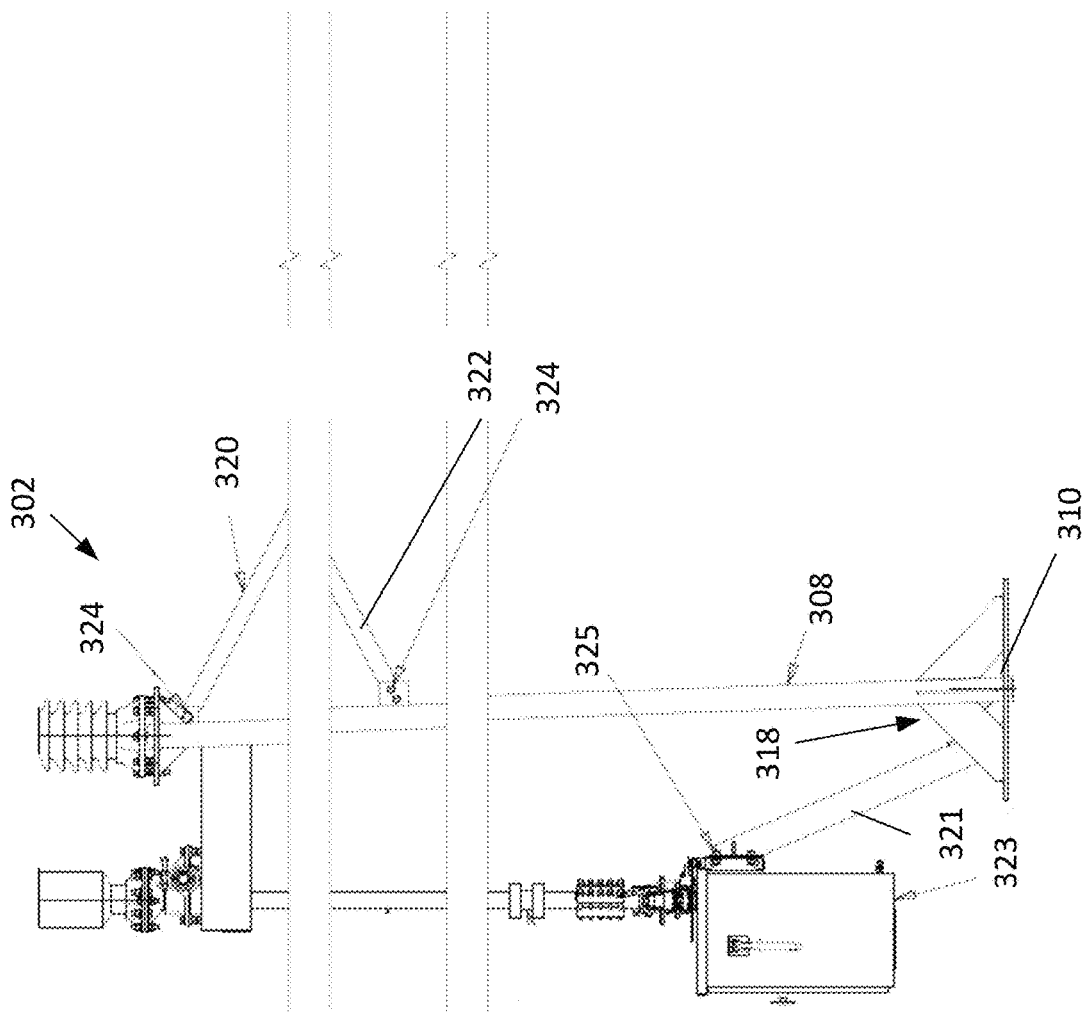
FIG. 4 depicts a pivot structure portion of the example seismic support structure shown in FIG. 3, according to one example embodiment.

FIG. 4 depicts certain sections of a pivot structure of the example seismic support structure shown in FIG. 3, according to one example embodiment. In this view, the pivot structure 302 can be seen with the second vertical column 308 extending from the first base plate 310. A first diagonal brace 320 and a second diagonal brace 322 can also be seen connecting to respective portions of the pivot structure 302. Corresponding support brackets 316 can be seen connecting between the diagonal braces and the pivot structure 302. Angled struts 318 positioned between the first base plate 310 and the second vertical column 308 are also shown. One or more angle beams 321 operable to mount to the first base plate 310 can support a motorized control device 323. A corresponding angle support bracket 325 is shown between the angle beams 321 and the motorized control device 323.

Figure 5:
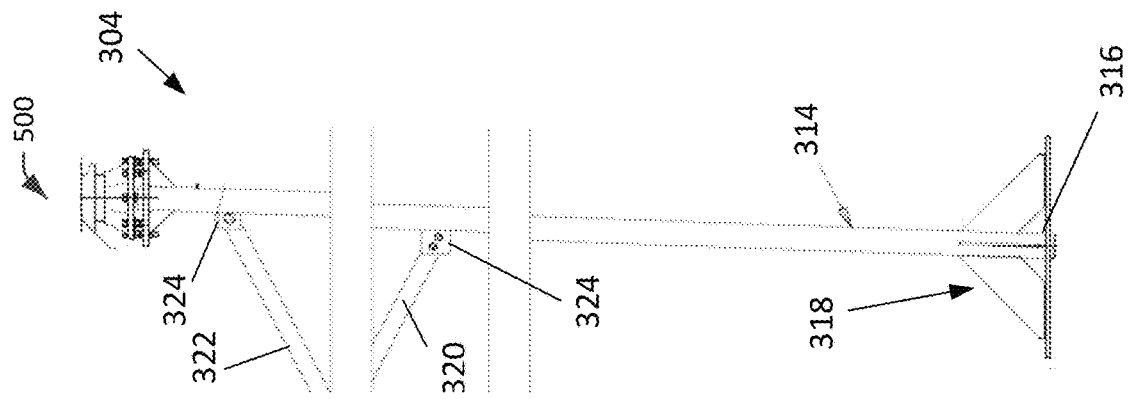
FIG. 5 depicts a jaw structure portion of the example seismic support structure shown in FIG. 3, according to one example embodiment.

FIG. 5 depicts certain sections of a jaw structure of the example seismic support structure shown in FIG. 3, according to one example embodiment. In this view, the jaw structure 304 can be seen with the fourth vertical column 314 extending from the second base plate 316. A first diagonal brace 320 and a second diagonal brace 322 can also be seen connecting to respective portions of the jaw structure 304. Corresponding support brackets 324 can be seen connecting between the diagonal braces 320, 322 and the jaw structure 304. Angled struts 318 are shown positioned between the second base plate 316 and the fourth vertical column 314.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A support structure for supporting high-voltage equipment above a surface, the support structure comprising:
   a pivot structure configured to elevate electrical equipment above the surface, the pivot structure comprising:
      a first base plate mounted to a surface, wherein the first base plate mounts to the surface at a central portion of the first base plate using one or more first threaded mounting bolts;
      a first vertical column extending from the first base plate and away from the surface;
      a second vertical column extending from the first base plate and away from the surface, wherein the first base plate is configured to maintain the first vertical column and second vertical column at a fixed distance from each other;
      one or more first set of angled struts positioned between the first vertical column and the first base plate, wherein each of the one or more first set of angled struts is welded to the first vertical column and further welded to the first base plate;
      one or more second set of angled struts positioned between the second vertical column and the first base plate, wherein each of the one or more second set of angled struts is welded to the second vertical column and further welded to the first base plate;
      at a predefined distance above the surface, a first horizontal strut extending between the first vertical column and the second vertical column;
      at an upper portion of the first vertical column and an upper portion of the second vertical column, a second horizontal strut extending between the first vertical column and the second vertical column; and
      at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure; and
   a jaw structure configured to connect to the pivot structure and increase flexibility of the support structure, the jaw structure comprising:
      a second base plate mounted to the surface, wherein the second base plate mounts to the surface at a central portion of the second base plate using one or more second threaded mounting bolts;
      a third vertical column extending from the second base plate and away from the surface;

a fourth vertical column extending from the second base plate and away from the surface, wherein the second base plate is configured to maintain the third vertical column and fourth vertical column at a fixed distance from each other;

one or more third set of angled struts positioned between the third vertical column and the second base plate, wherein each of the one or more third set of angled struts is welded to the third vertical column and further welded to the second base plate;

one or more fourth set of angled struts positioned between the fourth vertical column and the second base plate, wherein each of the one or more fourth set of angled struts is welded to the fourth vertical column and further welded to the second base plate;

at a predefined distance above the surface, a third horizontal strut extending between the third vertical column and the fourth vertical column;

at an upper portion of the third vertical column and an upper portion of the fourth vertical column, a fourth horizontal strut extending between the third vertical column and the fourth vertical column;

at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure; and wherein the support structure further comprises:

a first diagonal brace extending from a central portion of the first horizontal strut to a central portion of the fourth horizontal strut to connect the pivot structure to the jaw structure; and a second diagonal brace extending from a central portion of the second horizontal strut to a central portion of the third horizontal strut to further connect the pivot structure to the jaw structure.

2. The support structure of claim 1, wherein:
the first vertical column is a first vertically aligned column and the second vertical column is a second vertically aligned column, and the first and second vertically aligned columns are angled towards each other; and
the third vertical column is a third vertically aligned column and the fourth vertical column is a fourth vertically aligned column, and the third and fourth vertically aligned columns are angled towards each other.

3. The support structure of claim 1, wherein the first vertical column, the second vertical column, the third vertical column, the fourth vertical column, the first diagonal brace, and the second diagonal brace, each comprise a tubular shape.

4. The support structure of claim 1, wherein at least one vertical beam extends from the first base plate and supports control equipment associated with the high voltage equipment.

5. The support structure of claim 1, wherein the first vertical column is a first vertically aligned column and the second vertical column is a second vertically aligned column, and wherein a distance between an upper end of the first vertically aligned column and an upper end of the second vertically aligned column is less than the distance between a lower opposing end of the first vertically aligned column and a lower opposing end of the second vertically aligned column; and wherein the third vertical column is a third vertically aligned column and the fourth vertical column is a fourth vertically aligned column, and wherein a distance between an upper end of the third vertically aligned column and an upper end of the fourth vertically aligned column is less than the distance between a lower opposing end of the third vertically aligned column and a lower opposing end of the fourth vertically aligned column.

6. The support structure of claim 1, wherein the first base plate is connected to the first vertical column and the second vertical column by welds between each of the first base plate and the first vertical column and between the first base plate and the second vertical column.

7. The support structure of claim 1, wherein the first base plate comprises an oval shape flat plate with a first semi-circular portion at a first end and a second semi-circular portion an opposing second end, and the first vertical column mounts to the first semi-circular portion and the second vertical column mounts to the second semi-circular portion; and wherein the second base plate comprises an oval shape flat plate with a third semi-circular portion at a third end, and a fourth semi-circular portion an opposing fourth end, and the third vertical column mounts to the third semi-circular portion and the fourth vertical column mounts to the fourth semi-circular portion.

8. A method for providing a support structure for supporting high-voltage equipment above a surface, the method comprising:

providing a pivot structure configured to elevate electrical equipment above the surface, the pivot structure comprising:

a first base plate mounted to a surface, wherein the first base plate mounts to the surface at a central portion of the first base plate using one or more first threaded mounting bolts;

a first vertical column extending from the first base plate and away from the surface;

a second vertical column extending from the first base plate and away from the surface, wherein the first base plate is configured to maintain the first vertical column and second vertical column at a fixed distance from each other;

one or more first set of angled struts positioned between the first vertical column and the first base plate, wherein each of the one or more first set of angled struts is welded to the first vertical column and further welded to the first base plate;

one or more second set of angled struts positioned between the second vertical column and the first base plate, wherein each of the one or more second set of angled struts is welded to the second vertical column and further welded to the first base plate;

at a predefined distance above the surface, a first horizontal strut extending between the first vertical column and the second vertical column;

at an upper portion of the first vertical column and an upper portion of the second vertical column, a second horizontal strut extending between the first vertical column and the second vertical column; and at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure;

providing a jaw structure configured to connect to the pivot structure and increase flexibility of the support structure, the jaw structure comprising:
- a second base plate mounted to the surface, wherein the second base plate mounts to the surface at a central portion of the second base plate using one or more second threaded mounting bolts;
- a third vertical column extending from the second base plate and away from the surface;
- a fourth vertical column extending from the second base plate and away from the surface, wherein the second base plate is configured to maintain the third vertical column and fourth vertical column at a fixed distance from each other;
- one or more third set of angled struts positioned between the third vertical column and the second base plate, wherein each of the one or more third set of angled struts is welded to the third vertical column and further welded to the second base plate;
- one or more fourth set of angled struts positioned between the fourth vertical column and the second base plate, wherein each of the one or more fourth set of angled struts is welded to the fourth vertical column and further welded to the second base plate;
- at a predefined distance above the surface, a third horizontal strut extending between the third vertical column and the fourth vertical column;
- at an upper portion of the third vertical column and an upper portion of the fourth vertical column, a fourth horizontal strut extending between the third vertical column and the fourth vertical column;
- at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure;
- providing a first diagonal brace extending from a central portion of the first horizontal strut to a central portion of the fourth horizontal strut to connect the pivot structure to the jaw structure; and
- providing a second diagonal brace extending from a central portion of the second horizontal strut to a central portion of the third horizontal strut to further connect the pivot structure to the jaw structure.

9. The method of claim 8, wherein:
the first vertical column is vertically aligned with respect to the surface and the third vertical column is vertically aligned with respect to the surface, and the first vertical column and third vertical column are angled towards each other; and
the second vertical column is vertically aligned with respect to the surface and the fourth vertical column is vertically aligned with respect to the surface, and the second vertical column and fourth vertical column are angled towards each other.

10. The method of claim 8, wherein the first vertical column, the second vertical column, the third vertical column, the fourth vertical column, the first diagonal brace, and the second diagonal brace, each comprise a tubular shape.

11. The method of claim 8, wherein at least one vertical beam extends from the first base plate and supports control equipment associated with the high voltage equipment.

12. The method of claim 8, wherein the first vertical column is a first vertically aligned column and the second vertical column is a second vertically aligned column, and wherein a distance between an upper end of the first vertically aligned column and an upper end of the second vertically aligned column is less than the distance between a lower opposing end of the first vertically aligned column and a lower opposing end of the second vertically aligned column; and wherein the third vertical column is a third vertically aligned column and the fourth vertical column is a fourth vertically aligned column, and wherein a distance between an upper end of the third vertically aligned column and an upper end of the fourth vertically aligned column is less than the distance between a lower opposing end of the third vertically aligned column and a lower opposing end of the fourth vertically aligned column.

13. The method of claim 8, wherein the first base plate is connected to the first vertical column and the second vertical column by welds between each of the first base plate and the first vertical column and between the first base plate and the second vertical column.

14. The method of claim 8, wherein the first base plate comprises an oval shape flat plate with a first semi-circular portion at a first end and a second semi-circular portion an opposing second end, and the first vertical column mounts to the first semi-circular portion and the second vertical column mounts to the second semi-circular portion; and
wherein the second base plate comprises an oval shape flat plate with a third semi-circular portion at a third end, and a fourth semi-circular portion an opposing fourth end, and the third vertical column mounts to the third semi-circular portion and the fourth vertical column mounts to the fourth semi-circular portion.

15. A support structure for supporting high-voltage equipment above a surface, the support structure comprising:
a pivot structure configured to elevate electrical equipment above the surface, the pivot structure comprising:
- a first base plate mounted to a surface, wherein the first base plate mounts to the surface at a central portion of the first base plate using one or more first threaded mounting bolts;
- a first vertical column extending from the first base plate and away from the surface;
- a second vertical column extending from the first base plate and away from the surface, wherein the first base plate is configured to maintain the first vertical column and second vertical column at a fixed distance from each other;
- at a predefined distance above the surface, a first horizontal strut extending between the first vertical column and the second vertical column;
- at an upper portion of the first vertical column and an upper portion of the second vertical column, a second horizontal strut extending between the first vertical column and the second vertical column;
- at the upper portion of the first vertical column and the upper portion of the second vertical column, a first horizontal support plate extending between the first vertical column and the second vertical column, wherein the first horizontal support plate supports at least a first insulator associated with high voltage equipment elevated above the surface by the support structure;
- one or more first set of angled struts positioned between the first vertical column and the first base plate, wherein each of the one or more first set of angled struts is welded to the first vertical column and further welded to the first base plate; and one or more second set of angled struts positioned between the second vertical column and the first base plate, wherein each of the one or more second set of angled struts is welded to the second vertical column and further welded to the first base plate;

wherein the first base plate comprises an oval shape flat plate with a first semi-circular portion at a first end and a second semi-circular portion an opposing second end, and the first vertical column mounts to the first semi-circular portion and the second vertical column mounts to the second semi-circular portion; and a jaw structure configured to connect to the pivot structure and increase flexibility of the support structure, the jaw structure comprising:
- a second base plate mounted to the surface, wherein the second base plate mounts to the surface at a central portion of the second base plate using one or more second threaded mounting bolts;
- a third vertical column extending from the second base plate and away from the surface;
- a fourth vertical column extending from the second base plate and away from the surface, wherein the second base plate is configured to maintain the third vertical column and fourth vertical column at a fixed distance from each other;
- at a predefined distance above the surface, a third horizontal strut extending between the third vertical column and the fourth vertical column;
- at an upper portion of the third vertical column and an upper portion of the fourth vertical column, a fourth horizontal strut extending between the third vertical column and the fourth vertical column;
- at the upper portion of the third vertical column and the upper portion of the fourth vertical column, a second horizontal support plate extending between the third vertical column and the fourth vertical column, wherein the second horizontal support plate supports at least a second insulator associated with the high voltage equipment elevated above the surface by the support structure;
- one or more third set of angled struts positioned between the third vertical column and the second base plate, wherein each of the one or more third set of angled struts is welded to the third vertical column and further welded to the second base plate; and
- one or more fourth set of angled struts positioned between the fourth vertical column and the second base plate, wherein each of the one or more fourth set of angled struts is welded to the fourth vertical column and further welded to the second base plate; and wherein the second base plate comprises an oval shape flat plate with a third semi-circular portion at a third end, and a fourth semi-circular portion an opposing fourth end, and the third vertical column mounts to the third semi-circular portion and the fourth vertical column mounts to the fourth semi-circular portion;

wherein the support structure further comprises:
- a first diagonal brace extending from a central portion of the first horizontal strut to a central portion of the fourth horizontal strut to connect the pivot structure to the jaw structure; and
- a second diagonal brace extending from a central portion of the second horizontal strut to a central portion of the third horizontal strut to further connect the pivot structure to the jaw structure;

wherein the first vertical column is a first vertically aligned column and the second vertical column is a second vertically aligned column, and the first and second vertically aligned columns are angled towards each other;

wherein the third vertical column is a third vertically aligned column and the fourth vertical column is a fourth vertically aligned column, and the third and fourth vertically aligned columns are angled towards each other;

wherein the first vertical column, the second vertical column, the third vertical column, the fourth vertical column, the first diagonal brace, and the second diagonal brace, each comprise a tubular shape;

wherein at least one vertical beam extends from the first base plate and supports control equipment associated with the high voltage equipment;

wherein a distance between an upper end of the first vertically aligned column and an upper end of the second vertically aligned column is less than the distance between a lower opposing end of the first vertically aligned column and a lower opposing end of the second vertically column;

wherein a distance between an upper end of the third vertically aligned column and an upper end of the fourth vertically aligned column is less than the distance between a lower opposing end of the third vertically aligned column and a lower opposing end of the fourth vertically aligned column; and wherein the first base plate is connected to the first vertical column and the second vertical column by welds between each of the first base plate and the first vertical column and between the first base plate and the second vertical column.

* * * * *